(12) United States Patent
Talon et al.

(10) Patent No.: US 10,399,769 B2
(45) Date of Patent: Sep. 3, 2019

(54) CAPSULE FOR USE IN A FOOD PREPARATION MACHINE

(71) Applicant: NESTEC S.A., Vevey (CH)

(72) Inventors: Christian Talon, Vufflens-le-Chateau (CH); Samuel Odet, Vevey (CH); Jean-Luc Denisart, Cully (CH)

(73) Assignee: Societe des Produits Nestle S.A., Vevey (CH)

( * ) Notice: Subject to any disclaimer, the term of this patent is extended or adjusted under 35 U.S.C. 154(b) by 748 days.

(21) Appl. No.: 14/421,574

(22) PCT Filed: Aug. 21, 2013

(86) PCT No.: PCT/EP2013/067381
§ 371 (c)(1),
(2) Date: Feb. 13, 2015

(87) PCT Pub. No.: WO2014/029803
PCT Pub. Date: Feb. 27, 2014

(65) Prior Publication Data
US 2015/0183577 A1    Jul. 2, 2015

(30) Foreign Application Priority Data
Aug. 24, 2012   (EP) ..................................... 12181655

(51) Int. Cl.
*B65D 85/804* (2006.01)
*A47J 31/36* (2006.01)
*A47J 31/44* (2006.01)

(52) U.S. Cl.
CPC .......... *B65D 85/8046* (2013.01); *A47J 31/36* (2013.01); *A47J 31/3623* (2013.01); *A47J 31/4492* (2013.01); *B65D 85/8043* (2013.01)

(58) Field of Classification Search
CPC . A47J 31/0673; A47J 31/407; B65D 85/8043; B65D 85/804
(Continued)

(56) References Cited

U.S. PATENT DOCUMENTS

| | | | |
|---|---|---|---|
| 690,713 | A | 1/1902 | Ferres |
| 4,306,932 | A | 12/1981 | Bradatsch et al. |

(Continued)

FOREIGN PATENT DOCUMENTS

| | | |
|---|---|---|
| EP | 1654966 | 5/2006 |
| EP | 1864917 | 12/2007 |

(Continued)

OTHER PUBLICATIONS

Russian Office Action Appl. No. 2015110160 dated May 2, 2017—2 pages. (English translation).

(Continued)

*Primary Examiner* — Phuong T Nguyen
(74) *Attorney, Agent, or Firm* — K&L Gates LLP

(57) ABSTRACT

The present invention is directed to a capsule (11) for containing a food ingredient, adapted to be functionally inserted in the cavity of a food preparation machine (1), characterized in that said capsule (11) comprises at least one resilient portion (17, 19, 20, 21, 22, 23, 25, 26, 27, 29, 31, 33, 34, 35, 38) that is deformable when said capsule is inserted into the machine cavity, and/or when said cavity is closed, and in that at least one machine operational data is function of the elastic deformation properties of the resilient portion.

5 Claims, 11 Drawing Sheets

(58) Field of Classification Search
USPC ......... 99/295, 291, 285, 323, 300, 453, 452, 99/280; 426/433, 431, 425, 110, 112, 426/115, 77, 80, 84
See application file for complete search history.

(56) References Cited

U.S. PATENT DOCUMENTS

| | | | |
|---|---|---|---|
| 5,847,362 | A | 12/1998 | Sissons et al. |
| 8,919,240 | B2 | 12/2014 | Ozanne et al. |
| 9,010,237 | B2 | 4/2015 | Ozanne et al. |
| 9,538,876 | B2 | 1/2017 | Ozanne et al. |
| 2002/0005598 | A1* | 1/2002 | Kanda ............... B29C 45/76 264/40.1 |
| 2009/0095165 | A1* | 4/2009 | Nosler ............... A47J 31/007 99/289 R |
| 2010/0028495 | A1* | 2/2010 | Novak ............... A47J 31/0668 426/77 |
| 2010/0239733 | A1* | 9/2010 | Yoakim ............. A47J 31/3623 426/431 |
| 2011/0142996 | A1* | 6/2011 | Kruger ............... B65B 29/022 426/80 |
| 2011/0151060 | A1* | 6/2011 | Nakagiri ........... A47J 31/0642 426/77 |
| 2011/0212231 | A1* | 9/2011 | McLaughlin ........ A47J 31/36 426/231 |
| 2012/0251677 | A1* | 10/2012 | Yoakim ............... A47J 31/22 426/112 |
| 2013/0095214 | A1* | 4/2013 | Ozanne ............. A47J 31/407 426/115 |

FOREIGN PATENT DOCUMENTS

| | | |
|---|---|---|
| EP | 2236264 | 10/2010 |
| EP | 2537777 | 12/2012 |
| WO | 2010066705 | 6/2010 |
| WO | 2010137953 | 12/2010 |
| WO | 2011069829 | 6/2011 |
| WO | WO2011069830 A1 * | 6/2011 ............. A47J 31/22 |

OTHER PUBLICATIONS

Russian Office Action Appl. No. 2015110160 dated May 2, 2017—6 pages.

* cited by examiner

CAPSULE FOR USE IN A FOOD PREPARATION MACHINE

FIELD OF THE INVENTION

The present invention concerns an ingredient capsule for use in a food preparation machine, for instance in a liquid food preparation machine.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working with a rigid or semi-rigid capsule.

The machine comprises a receptacle or cavity for accommodating said capsule and a fluid injection system for injecting a fluid, preferably water, under pressure into the capsule. Water injected under pressure in the capsule, for the preparation of a coffee beverage according to the present invention, is preferably hot, that is to say at a temperature above 70° C. However, in some particular instances, it might also be at ambient temperature, or even chilled. The pressure inside the capsule chamber during extraction and/or dissolution of the capsule contents is typically about 1 to about 8 bar for dissolution products and about 2 to about 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee, within a few seconds.

The principle of extracting and/or dissolving the contents of a closed capsule under pressure is known, and consists typically of inserting the capsule in a receptacle or cavity of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patents n° EP 1472156 B1, and EP 1784344 B1.

Machines allowing the application of this principle have already been described for example in patents CH 605 293 and EP 242 556. According to these documents, the machine comprises a receptacle or cavity for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

In many instances, the machine comprises a capsule holder for holding a capsule, which is intended to be inserted in and removed from a corresponding cavity or receptacle of the machine. When a capsule holder is loaded with a capsule and inserted within the machine in a functional manner, the water injection means of the machine can fluidly connect to the capsule to inject water therein for a food preparation, as described above. A capsule holder was described for example in applicant's European patent EP 1967100 B1.

Capsules have been developed for such an application of food preparation, and in particular for beverage preparation, which are described and claimed in applicant's European patent EP 1784344 B1, or in European patent application EP 2062831.

In short, such capsules comprise typically:

a hollow body and an injection wall which is impermeable to liquids and to air and which is attached to the body and adapted to be punctured by e.g. an injection needle of the machine, a chamber containing a bed of roast and ground coffee to be extracted, or a soluble ingredient or mix of soluble ingredients, an aluminium membrane disposed at the bottom end of the capsule, closing the capsule, for retaining the internal pressure in the chamber.

The aluminium membrane is designed for being pierced with piercing means that are either integral with the capsule, or located outside of said capsule, for example within a capsule holder of the machine.

The piercing means are adapted for piercing dispensing holes in the aluminium membrane when the internal pressure inside the chamber reaches a certain pre-determined value.

Also, optionally, the capsule can further comprise means configured to break the jet of fluid so as to reduce the speed of the jet of fluid injected into the capsule and distribute the fluid across the bed of substance at a reduced speed.

Capsules of the prior art feature an injection wall or membrane (referred to as top membrane) which is to be pierced by a fluid injection element (e.g. needle) of a beverage preparation machine being part of a fluid system. When fluid is injected in the capsule compartment, a pressure is built up, which serves as an extraction means for extracting and/or dissolving ingredients contained inside the capsule, as described above. Such ingredients can be for instance a bed of roast and ground coffee. Alternatively or in combination with roast and ground coffee, the ingredients can comprise soluble ingredients, such as for instance beverage premixes.

Several systems are currently used for capsule identification by the machine, but the main drawback of existing solutions is the relatively high cost of identification systems and/or complexity and cost of a capsule adapted for such an identification. Such identification systems include but are not limited to: colour recognition, barcodes, recognition of protrusions, grooves, or other artifacts located at the surface of the capsule, conductivity, resistivity and generally all means known for detection or identification of the capsule by means of an electric current or magnetic field.

It is therefore an objective of the present invention to provide a capsule comprising improved and simplified means bearing data that correspond to at least one preparation parameter for the food product to be prepared out of said capsule.

SUMMARY OF THE INVENTION

The objective set out above is met with a capsule for containing a food ingredient, adapted to be functionally inserted in the cavity of a food preparation machine, characterized in that said capsule comprises at least one resilient portion that is deformable when said capsule is inserted into the machine cavity, and/or when said cavity is closed, and in that at least one machine operational data is function of the elastic deformation properties of the resilient portion.

By "at least one deformable resilient portion" of the capsule, it is meant that at least one part of the capsule has a shape, or is made of a material, that makes this part deformable mechanically, either elastically or plastically when a load is applied to it. This mechanical deformation of at least one portion of the capsule is caused by a mechanical load applied by the machine onto the capsule, at the time the capsule is inserted into the machine cavity, and/or at the time the machine cavity is closed to functionally enclose said capsule. Several embodiments will be described in the following detailed description.

By "deformation properties", it is meant that each object—in the present case a resilient deformable portion of a capsule—as a specific material behavior that depends from its shape and the material that makes it. The deformable material behavior law states that the force with which the deformable portion of the capsule pushes back when a load is applied onto it that makes it move from an equilibrium position, is a function to the distance of said tongue from this equilibrium position. In other words, depending on the type of material, size and geometry of each object, and the forces applied, various types of deformation may result.

By "operational data", it is meant any data that is functionally relevant to operate the machine, in order words, any data that can be used by the machine electronics to set a beverage preparation parameter. More precisely, an operational data corresponds to the setting value of a beverage preparation parameter, for instance if the beverage preparation parameter is water temperature, the operational data will be the value for this water temperature that is programmed in the machine electronic board so that said electronic board actuates the water heater to heat water at a certain corresponding temperature. In the present case of a food or beverage preparation machine, temperatures used for the water that is mixed with a precursor ingredient to make the final food or beverage product are generally within the range of 4° C. to 100° C., preferably within the range of 12° C. to 85° C. As a more precise example, most beverage preparation machines on the market use two different temperatures, depending on the type of beverage to be produced. In this case, the machine operational data that corresponds to water temperature can have the value "hot" or "cold", depending on which type of beverage is brewed (such a value is of course coded within the machine electronic program as a digital value).

In a first embodiment of the invention, the resilient portion comprises a series of tongue-shaped protrusions.

In a second embodiment of the invention, the resilient portion comprises a coiled spring portion.

In a third embodiment of the invention, the resilient portion comprises a bellows portion of the capsule side walls.

Advantageously, said resilient portion can be located at the periphery of said capsule external surface, preferably in the upper portion of said capsule.

In one possible alternative of the invention, at least one of the external dimensions of the capsule can be greater than the corresponding internal dimensions of the cavity, and wherein the resilient deformable portion is located such as to allow said capsule to compress elastically and fit within said cavity when the latter is closed in a functional configuration.

In a second possible alternative of the invention, at least one of the external dimensions of the capsule can be smaller than the corresponding internal dimensions of the cavity, and wherein the resilient deformable portion is located such as to allow said capsule to expand elastically and fit within said cavity when the latter is closed in a functional configuration.

In any case, the resilient portion is preferably deformable with an amplitude comprised between 0.1 mm and 20 mm, preferably comprised between 0.15 mm and 1.0 mm, more preferably comprised between 0.5 mm and 5 mm.

Furthermore, the resilient portion can be advantageously oriented such that it deforms along an axis D which is substantially parallel to the vertical axis of said capsule.

Preferably, the resilient portion is deformable by action of a force comprised between 0.5N and 50N, more preferably between 5N and 45N, most preferably between 1.6N and 22N.

In another aspect of the same invention, the present application is directed to a food preparation system comprising:

an ingredient capsule according to the present invention and in particular as described above, and a food preparation machine adapted to cooperate functionally with said capsule, said machine comprising a cavity for receiving said capsule such that a food product can be prepared in the latter by injection of a fluid from said machine into said capsule, characterized in that said cavity comprises a pressure sensitive portion adapted to cooperate with the capsule resilient deformable portion to transmit operational data from said capsule to said machine, said data being function of the elastic deformation properties of said resilient portion.

In a preferred embodiment of the invention, the pressure sensitive portion is linked to a control board of said machine, such that cooperation between said machine sensitive portion and said capsule resilient portion is able to trigger an operation within said machine when the capsule resilient portion transmits a mechanical deformation to said pressure sensitive portion, said operation being recognition switching said machine on or off, and/or setting a food preparation parameter comprised within the list of, but not limited to: volume, temperature, and/or viscosity of the food to be dispensed, pressure of the fluid injected within the capsule, and/or infusion/mixing time.

In a first embodiment of the invention, said pressure sensitive portion is a pressure sensor connected to an electrical switch.

In a second alternative embodiment of the invention, said pressure sensitive portion is a mechanical switch.

In any case, the food product is preferably a liquid or semi-liquid product prepared within the capsule by injecting a fluid to be mixed with the encapsulated ingredient, at a pressure comprised between 0.5 and 30 bar, preferably comprised between 1 and 20 bar, more preferably a pressure comprised between 2 and 15 bar.

As a general principle underlying the invention, the deformation applied to the resilient deformable portion of the capsule follows a material behavior law, such that the force generated by the deformation of said deformable portion is a direct function of said deformation, whatever the type of deformation: compression, flexion or torsion. In all types of deformation, the material behavior law states that the force with which the spring, or tongue or twisted portion, pushes back is a function to the distance from its equilibrium length, as follows:

$$F=f(x)$$

where

"x" is the displacement vector—the distance and direction the resilient portion is deformed from its equilibrium length.

"f(x)" is the magnitude and direction of the restoring force the spring exerts.

Coil springs and other common springs typically obey Hooke's law.

There are useful springs that don't: springs based on beam bending can for example produce forces that vary nonlinearly with displacement.

In the case of the present invention, it is assumed that the resilient deformable portion of the capsule is a complex spring element, which produces a force under deformation that is not necessarily linearly linked to the deformation amplitude.

By "food", it is meant any kind of edible product. This encompasses but is not limited to: pasty, semi-liquid, liquid products having more or less viscosity, such as liquid beverages (e.g. teas, coffee, chocolate-based beverages, soups), purees, ice cream or sorbets, soft ice cream, yogurt preparations, infant nutrition such as infant milks, cereal-based preparations.

In a preferred embodiment of the present invention, said food products are liquid or semi-liquid, and in particular cold, ambient, or hot beverages. In the following description, it will be considered as an example, that the capsule according to the invention is used with a liquid beverage preparation machine.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
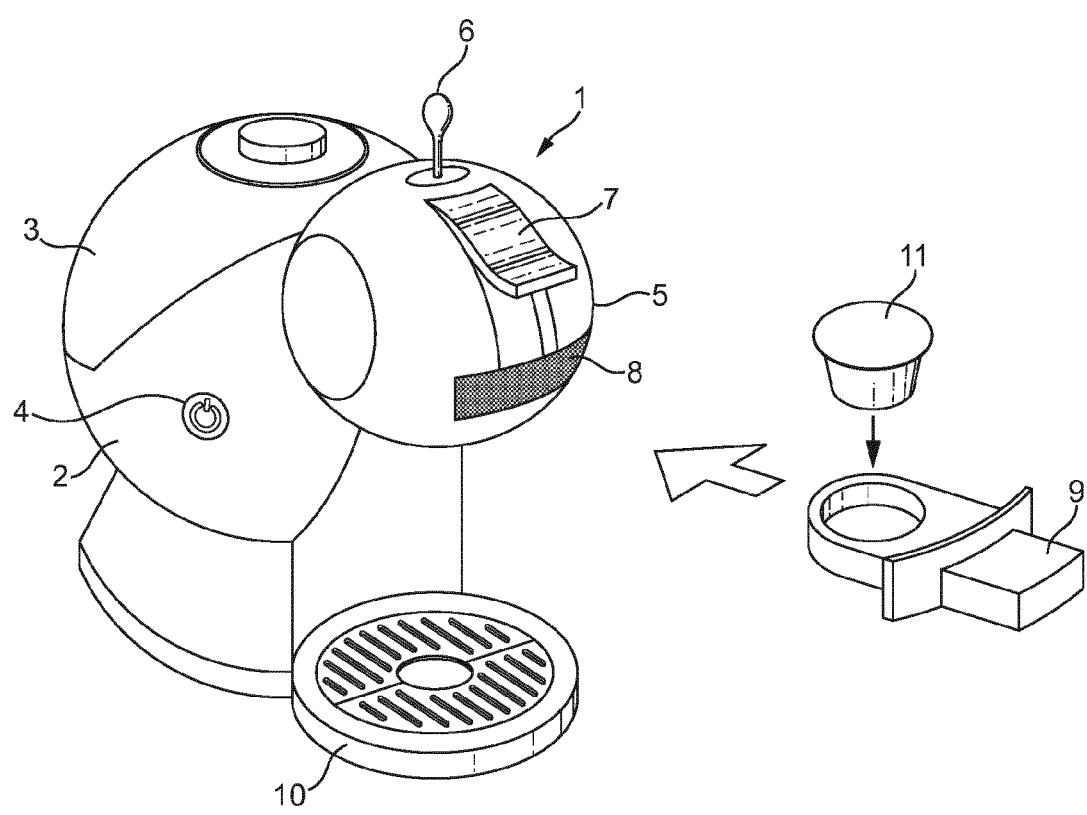
FIG. 1 is a schematic perspective view of a food/beverage preparation machine suitable for use with an ingredient capsule according to the invention.

The capsule according to the present invention is meant to be used with a beverage preparation machine illustrated in FIG. 1, thus forming a beverage preparation system.

As shown in FIG. 1, the machine 3 comprises a machine body 2, a water reservoir 3 that can be removed from the machine body 2 for refill. The body 2 comprises a on/off push button 4. The machine 3 further comprises a extraction head 5. The head 5 comprises a water temperature selector 6 for hot or cold water, a locking lever 7, and an opening 8 for insertion of a capsule holder 9. The machine 3 further comprises a cup tray 10, for holding a cup under the extraction head.

Figure 2A:
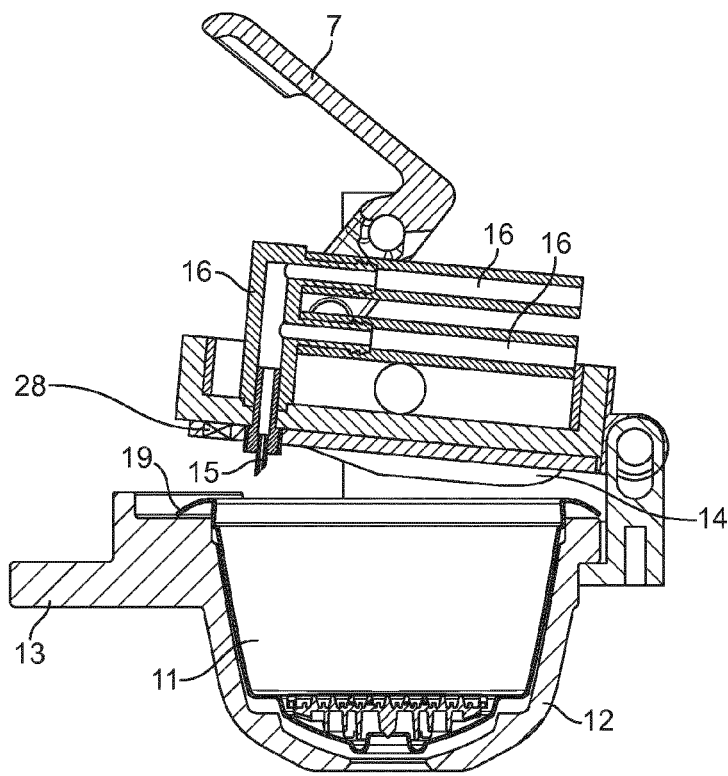
FIGS. 2A and 2B are schematic perspective views of a capsule according to the invention inserted into an open, respectively closed, receptacle of a food/beverage preparation machine.
Figure 2B:
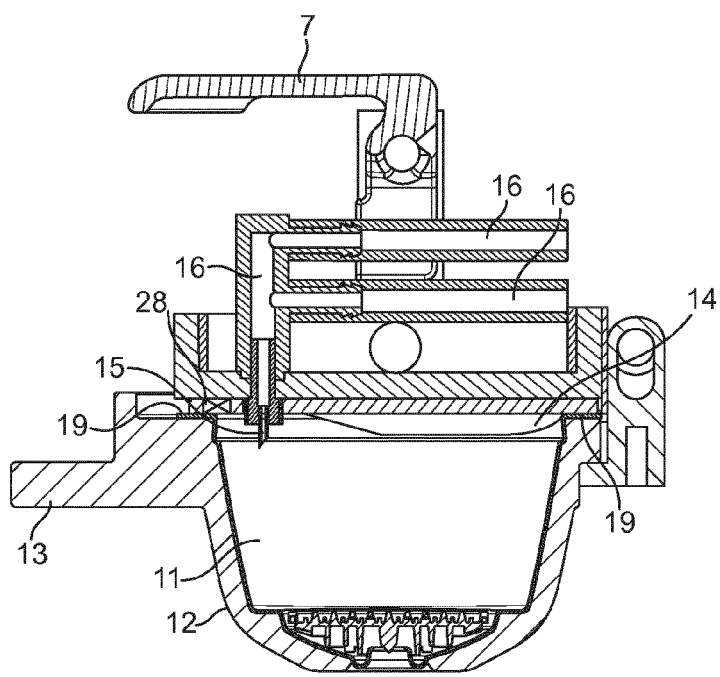

The capsule holder 9 is adapted to receive a capsule 11. An profile cut view of the capsule holder 9 is shown in FIGS. 2A and 2B, wherein a capsule 11 is disposed, said holder 9 and capsule 11 being inserted into the corresponding receptacle of the extraction head. The capsule holder 9 comprises a body portion 12 designed as a receptacle for the capsule 11, and further comprises a handle 13.

The capsule 11 comprises a capsule body which has a generally frusto-conical body, closed at its bottom by a bottom wall integrally formed with the body side walls. The centre of the bottom wall comprises an opening which serves as a dispensing opening to let the beverage prepared therein, flow out of said capsule into a cup placed here below. The capsule further comprises a pierceable aluminum membrane that is sealed inside the capsule, close to the bottom wall, as well as a piercing plate for piercing said aluminum membrane when pressure inside the capsule increases. The piercing plate is located between the aluminum membrane and the bottom wall of the capsule. Finally, the capsule is closed at its top by a pierceable membrane. The capsule is made such that it is moisture and oxygen barrier.

More precisely, FIG. 2A represents a capsule 11 loaded within a capsule holder 9, both being inserted into the extraction head 5 when the latter is in the open position. In that open position, the locking lever 7 is in the upward position, unlocked. The extraction head 5 comprises a movable needle plate 14 with a needle 15 adapted for piercing through a wall of the capsule and injecting water (or another fluid) under pressure within the capsule. Water under pressure is pumped by a pump of the machine, from the water reservoir 3, through a system of pipes (not illustrated) and fluid connectors 16 of the extraction head 5. When the extraction head 5 is in the open position, the needle plate is placed away from the capsule holder, as well as the needle 15 which is distant from the capsule, as illustrated in FIG. 2A.

When the consumer actuates the locking lever 7 downwards as shown in FIG. 2B, the needle plate 14 is moved downwards and the extraction head 5 is closed. In that position, the needle 15 pierces through the top wall of the capsule, and is in proper configuration for water injection under pressure therein.

In other words, as can be understood, the extraction head 5 of the machine comprises a capsule receptacle having a volume and shape substantially similar to the external volume and shape of a capsule. The capsule receptacle of said extraction head is defined by the capsule holder 9 and the needle plate 14 located above the capsule holder. The needle plate is movable substantially vertically towards, and away from, said capsule holder, in order to respectively close, and open the capsule receptacle. When the needle plate is lifted away from the capsule holder, i.e. when the extraction head is in the open position, the capsule holder can be moved into, or out of, the extraction head by sliding it like a drawer. FIG. 2B shows the extraction head closed with the capsule holder loaded with a capsule, and inserted therein, and the needle plate in the closed (i.e. moved down) position. As it is apparent in FIG. 2B, in that closed position, the external volume and shape of the capsule generally correspond and fit to the volume and shape of the receptacle defined by the capsule holder and needle plate.

As explained above, the present invention aims at providing a simple, cost-efficient, and reliable way to integrate data to the structure of the capsule. Such data can correspond to the type of ingredient contained in the capsule, and/or it can correspond to one or several parameters for preparation of a food or beverage from the capsule. The data integrated into the capsule mechanical structure can be used by interaction between the capsule and the machine, but not necessarily. For instance, such data can be read by a mechanical reading device 40, such as a pressure force sensor installed in the factory, to read and control the quality of the capsules produced on line.

The pressure sensor 28 can be installed within the machine at any suitable location that will allow said sensor to sense the elastic and/or plastic deformation of the capsule when the latter is introduced in the capsule receptacle of the machine, or at the time said capsule receptacle is being closed. For instance, the sensor 28 can be integrated to the needle plate 14 as illustrated in FIGS. 2A and 2B, and function such that once the capsule is introduced within the capsule holder of the machine, the sensor 28 will be able to sense the deformation of the capsule when the capsule-receiving cavity of the machine is closed and said needle plate 14 is brought in contact with the elastically deformable portion of the capsule as shown in FIG. 2B. In that position, as illustrated in FIG. 2B, the capsule elastic deformable portion (several alternative embodiments of such deformable portions will be given hereafter) is deformed elastically which produces a deformation force which can be sensed by the machine as the sensor 28 is in contact with, and presses onto the capsule. The sensed value of the mechanical deformation is converted by a program memorized in a machine electronic chip, into a machine operational data, such as a water temperature value, or a volume of water to be pumped through the capsule from the machine reservoir.

A capsule according to the invention is particularly advantageous for quality control as it provides a cheap and reliable way to read and compare data from the capsule mechanical properties. Typically, various ingredients can be packed in capsules having the same external appearance. According to the present invention, it is possible adapt one filling parameter to the mechanical properties of the capsule, e.g. to ensure that one particular type of ingredient is present within a capsule in a sufficient quantity. In that case, the factory manufacturing line will be equipped with a scale that weighs each capsules, and with a pressure force sensor that senses the elastic property of a resilient portion of the capsule. Such a method is reliable, fast, and inexpensive. Moreover, the fact that the detection of the data contained in the capsule structure is performed within the elastic deformation range of the material, guarantees that the capsule is not damaged, while proving a relatively large scale of possible coding values.

Alternatively, or in addition to factory quality control, the invention can be useful at the time the capsule is inserted within the beverage preparation machine. Typically, the data contained in the resilient deformable portion of said capsule can be read by a pressure sensor that is integrated in the beverage preparation machine, or alternatively in the capsule holder. The pressure sensor can actually be integrated in any location of the machine or capsule holder, as long as said sensor is in contact with the capsule—particularly with the resilient deformable portion of the latter—when said capsule is functionally inserted within the machine and/or capsule holder.

Due to the spring effect, a counterforce is applied by the capsule to the machine, and more precisely to the pressure sensor that is integrated in said machine.

Depending on the counterforce measured by the pressure sensor, the machine reads at least one beverage preparation data concerning the ingredient contained in the capsule and/or the parameters to prepare a beverage out of said ingredient. The translation of the counter pressure measurement into a data is performed by using a computer chip integrated inside the machine, which interprets the pressure that is sensed into a beverage preparation parameter code, or any other similar data such as the type of capsule that is inserted, or type of beverage ingredient contained inside the capsule.

The resilient deformable portion of the capsule 11 can take various forms, shapes and dimensions, some of which will now be described in more detail with reference to the accompanying drawing, as examples.

Figure 3:
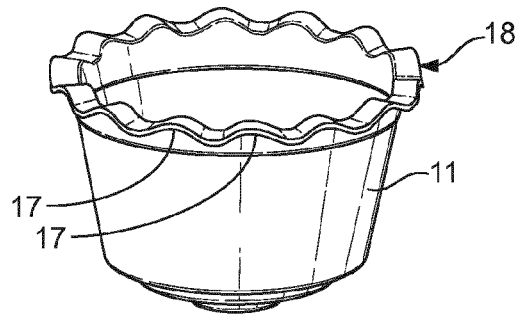
FIGS. 3 to 9 are schematic perspective views of seven embodiments of a capsule according to the invention.
Figure 4:
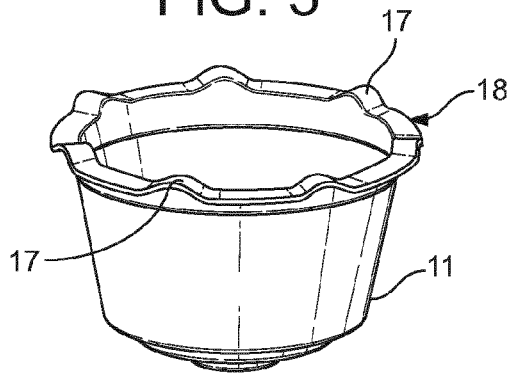

In a first embodiment illustrated in FIG. 3, the resilient deformable portion of the capsule 11 can take the form of a series of wave-shaped protrusions 17 located at the periphery of the capsule top edge 18. The number of wave-shaped protrusions 17 across the periphery of the capsule top edge 18 can vary, depending on the force (counter-pressure) required for carrying data, according to the principle of the invention. As shown in FIG. 4, the number of wave-shaped protrusions 17 can be diminished compared to that of the capsule shown in FIG. 3, if need be.

When a capsule according to this first embodiment is placed in a capsule holder and functionally inserted into the corresponding recess of the beverage preparation machine, the top surface of the wave-shaped protrusions 17 protrudes above the level of the capsule holder's upper surface. The capsule is therefore higher than the capsule holder, such that when the user closes the machine head—as described above with reference to FIG. 2B—the lower surface of the needle plate 14 is brought in contact with the tip portion of each protrusion 17. When the locking lever 7 is pressed downwards to completely close the machine head, a pressure is exerted onto the wave-shaped protrusions 17 by the needle plate 14, which causes an elastic deformation of said protrusions 17. This deformation causes the protrusions to mechanically exert a counterforce onto the needle plate. Said needle plate comprises a pressure sensor (not illustrated in the drawing), which senses the counterforce applied by the deformed protrusions 17. The counterforce that is created is function of the mechanical characteristics of the protrusions 17, more specifically, it is function of their constitutive material, of their shape, in particular their thickness and their curvature. And it is also function of the amount of protrusions, which can vary as explained above: A higher number of protrusions will provide a higher quantity of energy in the spring effect generated by the deformation of said protrusions, that is to say, a higher counterforce.

Figure 5:
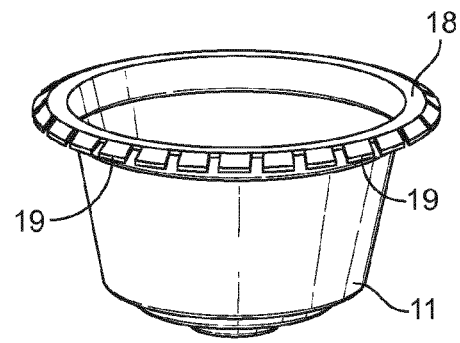
Figure 6:
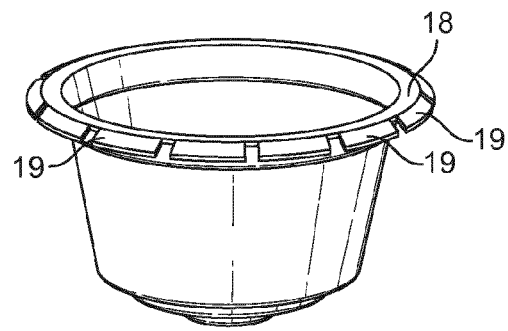

In a second embodiment illustrated in FIG. 5, the resilient deformable portion of the capsule 11 comprises a plurality of tongues 19. The number and width of the tongues can vary, and for instance, FIG. 6 shows a capsule wherein the tongues are less numerous but wider than those shown in the embodiment of FIG. 5. The tongues shown in FIGS. 5 and 6 extend outwardly from the top edge 18 of the capsule, and are directed downwards, with an angle comprised between 0 and 70 degrees relative to the horizontal plane. In this case, the tip of the tongues rest on the top surface of the capsule holder 9 when the capsule 11 is inserted therein as illustrated in FIG. 2A, such that when the beverage machine extraction head 5 is closed by the user, the needle plate 14 that moves downwards comes in contact with the top edge 18 of the capsule and presses the latter downward during the closing movement of the machine head 5, which results in the tongues 19 being deformed elastically and their tip moved upward to allow closure of the head 5. When the extraction head is closed, the tongues 19 are pinched between the upper surface of the capsule holder 9 and the lower surface of the needle plate 14, such that said tongues are oriented generally in the same plane as the rest of the capsule top edge 18 as illustrated for instance in FIG. 2B, i.e. generally horizontally. When the extraction head is opened again, and the needle plate 14 moves upwards, the tongues 19 move back to be oriented downwards again as shown in FIG. 5 or 6, and such that the whole capsule is moved automatically up from the capsule holder 9. In this position, the resilient portion of the capsule, i.e. the tongues 19, is deformed and the mechanical deformation produces a counterforce onto the elements of the machine extraction head, in particular onto the needle plate and the pressure sensor integrated therein, as shown in FIG. 2B. The mechanical deformation is sensed by the sensor and converted by the machine electronic chip into a machine operation data, such as a volume, pressure, or temperature setting parameter value for the water that is to be delivered by the machine into the capsule. The mechanical deformation of the tongues 19 can either be elastic (i.e. reversible) or plastic (i.e. permanent). Furthermore, the sensor can be programmed to sense one deformation force value, at one given time (for instance when the machine extraction head is completely closed), or alternatively, the sensor 28 can be programmed to sense and memorize various deformation force values of the capsule, while the machine extraction head is being closed. In this latter case, the machine can establish a deformation profile for the capsule, which is function of the material that is used for making the deformable portion of the capsule (in the present embodiment, the material that is used for making the tongues 19). When sensing a mechanical deformation profile of the capsule, rather than one single deformation force value, it is possible to program the machine to calculate several operational data. In other terms, the coding of setting parameters within the capsule becomes more complex and more than one information is coded within the capsule structure. For instance, it is possible to code for water temperature and for the volume of water to be injected within the capsule as well, by sensing a deformation profile, rather than one single deformation value. The exact algorithm that is programmed in the chip of the machine can vary, and be appropriately chosen, depending on the capsule structure, and also depending on how many different operational data should be embedded in the each capsule structure.

For instance, only one operational data can be coded within the capsule structure, which is e.g. water temperature. If only two types of temperature are to be coded, hot or cold, two different types of capsules will be made, each having different types of resilient deformable portion. In the present embodiment, the first type of capsules can have small tongues as illustrated in FIG. 5. The small tongues, when deformed horizontally due to the extraction head being completely closed as illustrated in FIG. 2B, will generate a deformation force that is for example 0.5 N. This value of 0.5N is sensed by the sensor integrated in the needle plate, and will be converted into an operational data through a proper algorithm, into for instance a value "hot" for the water temperature, such that the machine heater will be started in order to produce hot water to be delivered to the capsule. In case a capsule having larger tongues 19 (as shown in FIG. 6) is inserted into the machine, the deformation force sensed by the sensor will be different due to the different mechanical structure of the resilient deformable portion of the capsule (i.e. the tongues which in this case are larger). For instance, as the tongues are larger, their mechanical resistance is greater and the deformation force that will be generated is also greater, for instance 1N, when the extraction head is closed. In that case, the measured deformation force will be converted by the machine as a "cold" value for the water temperature to be injected into the capsule.

Instead of water temperature, other machine operational data can be converted from the sensed elastic or plastic deformation of the resilient portion of the capsule.

Also, not only a portion of the capsule such as the tongues 19 can be deformable, but the whole capsule can be made of a deformable material. In that case, the result is the same and a sensor embedded in the machine so as to be in contact with the capsule during closing and/or when the extraction head is closed, will be able to sense a mechanical deformation so that the machine program can convert it into a machine operational data (water temperature setting, or water pressure, or volume of water to be injected within the capsule).

Figure 7:
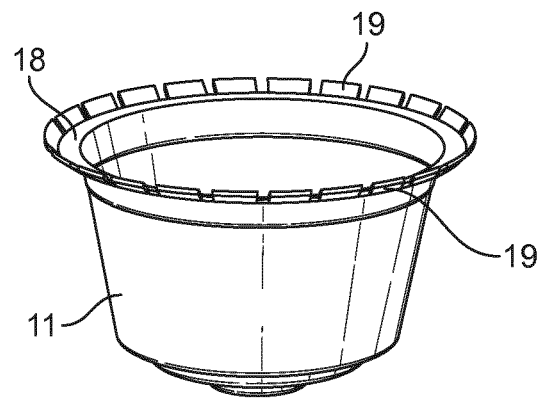
Figure 8:
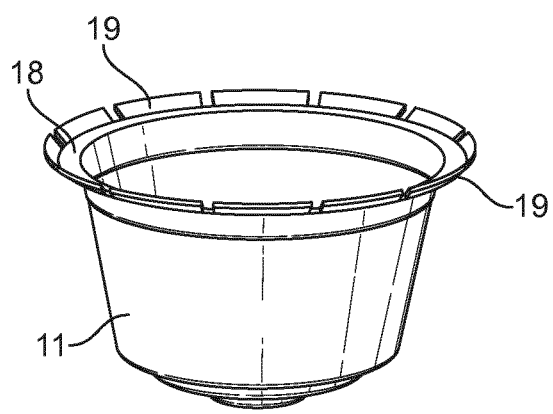

As an alternative, the tongues 19 can be directed upwards as shown in FIGS. 7 and 8, with an angle comprised between 0 and 70 degrees relative to the horizontal plane. In this embodiment, the deformation movement of the tongues 19 during closing of the machine extraction head is opposite to that described above in relation to FIGS. 5 and 6. More precisely, when the needle plate 14 moves downwards during closing of the extraction head 5, the tip of the tongues illustrated in FIGS. 7 and 8 come in contact with the lower surface of the needle plate 14, which presses and moves said tongues 19 downwards until the head is closed. In the closed position of the extraction head, the tongues are also positioned generally in the same plane as the rest of the capsule top edge 18, i.e. generally horizontally as shown in FIG. 2B.

Then, after extraction when the user opens the extraction head 5 again, the needle plate 14 is moved upwards again, which releases the tongues. The latter move back upwardly to retrieve their normal shape as shown in FIG. 7 or 8.

Figure 9:
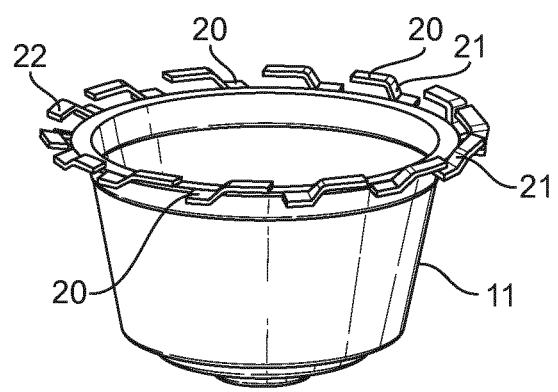

As an alternative to the straight tongues illustrated in FIGS. 5 to 8 and described above, the capsule can comprise resilient deformable tongues having a more complex shape as shown in FIG. 9. In this case, each tongue 19 comprises a first lower portion 20 which is generally horizontal, that links the tongue to the rest of the capsule. The tongue further comprises a second intermediate portion 21 which is oriented upwardly, and a third upper portion 22 which is substantially horizontal as well as the first portion 20. The third portion 22 comes in contact with the lower surface of the needle plate 14 when the extraction head 5 is closed, while the first lower portion 20 of each tongue 19 rests onto the upper surface of the capsule holder 9. When the needle plate 14 moves downwards as a result of the extraction head 5 being closed, the intermediate portion 21 of each tongue deforms elastically to bring the upper portion 22 on the same plane as the first portion 20. When the extraction head is closed, each tongue is flattened and the elastic deformation causes said tongue to generate a counterforce which tends to separate the needle plate and capsule holder. This counterforce can be measured by a pressure sensor located for instance in the needle plate.

In the first and second embodiments described above in reference to FIGS. 3 to 9, the resilient deformable portion of the capsule is such that the upper portion of the capsule protrudes out of the capsule holder when inserted therein. As a consequence, a suitable location for a pressure sensor will be in the needle plate, such that the counterpressure force generated by the deformed portion of the capsule, will be measured when the needle plate comes in contact with, and starts to deform the wave-shaped protrusions 17, or the tongues 19 described above.

Importantly, it is clear that preferably, and as described above with reference to the first and second embodiments, the volume of the capsule is greater than the volume of the receptacle in the extraction head of the beverage machine. As explained above, this difference of volume between the capsule and its receptacle within the extraction head receptacle, causes the capsule to deform when said extraction head is closed, so as to adapt to a smaller volume. This deformation is primarily directed to the resilient deformable portion of said capsule. This principle is considered a preferred option of the present invention. However, other possibilities to deform the resilient deformable portion of the capsule can be considered which will be described hereafter, in reference to a third embodiment and to FIGS. 10A and 10B.

Figure 10A:
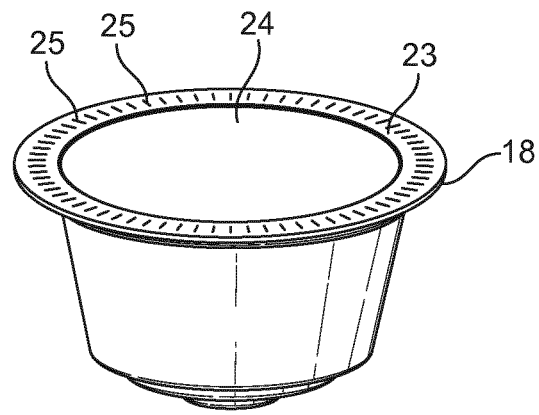
FIGS. 10A and 10B are schematic perspective views of an eighth embodiment of a capsule according to the invention.
Figure 10B:
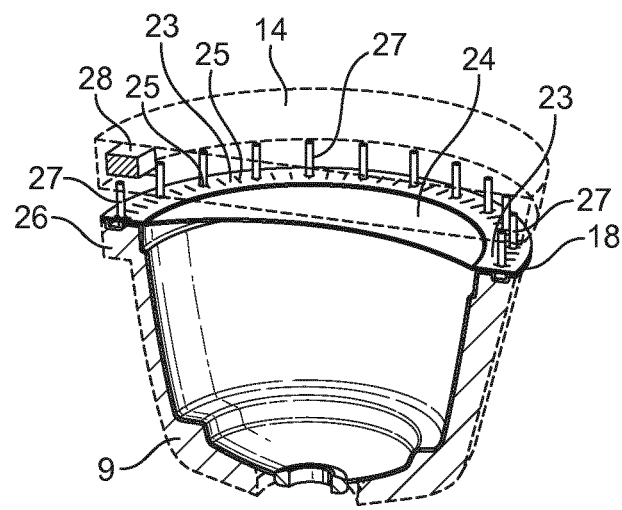

In a third embodiment illustrated in FIGS. 10A and 10B, the resilient deformable portion of the capsule takes the form of a deformable area 23 of the top membrane of the capsule, in combination with a recessed portion of the capsule top edge 18. As illustrated in FIG. 10A, the deformable area 23 is in the outermost zone of the top membrane 24, where the latter is sealed onto the capsule top edge 18. This deformable area 23 of the capsule comprises slits 25 which extend radially in the middle part of the area 23, as shown in FIG. 10A. The slits 25 create weaknesses in the area 23 of the top membrane, creating resiliently flexible portions in the latter. Further, FIG. 10B shows the recessed portion 26 of the capsule top edge, which guarantees that the cut out area 23 of the top membrane can flex downwards into said recess 26, when a pressure is exerted onto said area 23 from above the capsule.

The outermost portion of the machine needle plate 14 illustrated in dotted lines in FIG. 10B, comprises a series of pin-shaped protrusions 27 extending downwards, which are positioned so as to contact the deformable area 23 when the machine extraction head is closed and the needle plate moves downwardly towards the capsule. In that position, the latter is positioned within the capsule holder 9 such that the top edge 18 rests on, and protrudes from, the top surface of said capsule holder, and such that the deformable area 23 is directly accessible from above said capsule. During closing of the extraction head of the machine, when the needle plate 14 moves downwardly towards the capsule holder 9 and the capsule inserted therein, the pin-shaped protrusions 27 press onto the deformable area 23 of the top membrane and flex it downwardly into the recessed portion 26. The pin-shaped protrusions 27 are connected to, or part of, a pressure sensor 28 located in the needle plate 14, which senses and measures the elastic counterforce generated by the elastically deformed area 23 of the top membrane.

As already explained above, the measured force applied to the sensor by the resiliently deformed portion of the capsule corresponds to a predetermined value, which depends from the mechanical properties of the top membrane 24, in particular which depends on the force constant "k" of the resilient deformable portion of the capsule. This measured force is directly linked to a data value, which corresponds to a beverage preparation parameter to be set in the machine. A computer chip of the beverage machine, will interpret the measured force as a given value for a beverage preparation parameter, such as a given temperature for the fluid that will be injected within the capsule, and/or a given fluid injection pressure, and/or a given volume of fluid to be injected within the capsule.

For instance, if the elastic force measured by the sensor is 0.02 N, the machine will interpret it to inject 60 ml of water at 83° C. within the capsule. If the measured value is 0.06N, the machine will inject 180 ml of ambient temperature water.

According to the invention, the mechanical properties, and particularly the elastic deformation properties of the resilient deformable portion of the capsule, are predetermined by carefully selecting such constructional parameters for the capsule deformable portion (depending of which type of resilient deformable portion is used) such as: the type of material which is used, the shape of the deformable portion, e.g. thickness of the top membrane 24 and width and length of the precut slits 25 in the third embodiment described above, or the length, thickness and angle of deformable tongues 19 in the first or second embodiment described above, etc. The machine is then programmed so as to be able to translate the measured force into given beverage preparation parameters (e.g. volume, pressure, and/or temperature of the fluid injected in the capsule).

According to each particular embodiment of a resilient deformable portion of the capsule, the pressure sensor in the machine or in the capsule holder will be adapted accordingly, in order to be able to sense the elastic deformation force generated by the capsule when said deformable portion is deformed (in the factory, or in the machine during use).

Figure 11:
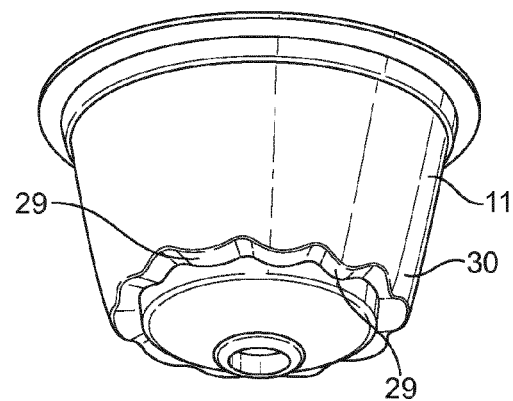
FIG. 11 is a schematic perspective view of a ninth embodiment of a capsule according to the invention.

In a fourth embodiment illustrated in FIG. 11, the resilient deformable portion of the capsule comprises a series of curved protrusions 29 oriented downwardly, which extend from a bottom edge 30 of the capsule 11. The curvature of each protrusion 30 provides sufficient flexibility to the latter to flex under pressure. In use, when the capsule is introduced in the capsule holder, the protrusions 30 rest on a corresponding edge of the capsule holder (not shown in the drawing) such that the whole capsule is lifted compared to a capsule not featuring such protrusions, and such that the top edge 18 of the capsule is lifted above the level of the capsule holder upper surface. When the extraction head of the machine is closed, the needle plate 14 presses onto the upper surface of the capsule, which is moved downwards, until the top edge 18 is in contact and rest upon the upper surface of the capsule holder. In that closed position of the extraction head, i.e. when the top edge 18 is pinched between the capsule holder and the needle plate (as shown for instance in FIG. 2B), the curved protrusions 29 of the capsule are elastically deformed inwardly (i.e. the protrusions 29 flex inside the capsule) so that the external volume of the capsule is decreased to fit the volume of the capsule receptacle inside the extraction head of the machine. In that position, the elastically deformed protrusions 29 generate a counterforce which is directed vertically towards the top of the capsule. This counterforce can be measured by a pressure sensor 28 located inside, or in contact with, the needle plate. When the extraction head of the machine is opened again, the needle plate is lifted away from the capsule and capsule holder. At that time, the protrusions 29 flex back in their normal position such that the capsule is lifted from the capsule holder. Beyond the advantage provided by the invention (i.e. the capsule contains beverage preparation parameter data inside the predetermined elastic deformation force generated by the protrusions 29), this embodiment is also interesting in that the effect of elastic deformation of the capsule provides a lifting effect which facilitates handling of a used capsule and its removal from the capsule holder when the beverage is prepared and the capsule is to be disposed of: due to the fact that the top edge 18 of the capsule is positioned above the capsule holder, it is easier for the user to seize said top edge to remove the capsule from the capsule holder.

Figure 12A:
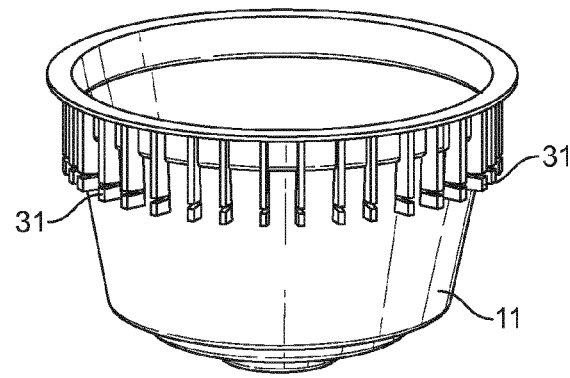
FIGS. 12A and 12B are schematic perspective views of a tenth embodiment of a capsule according to the invention.
Figure 12B:
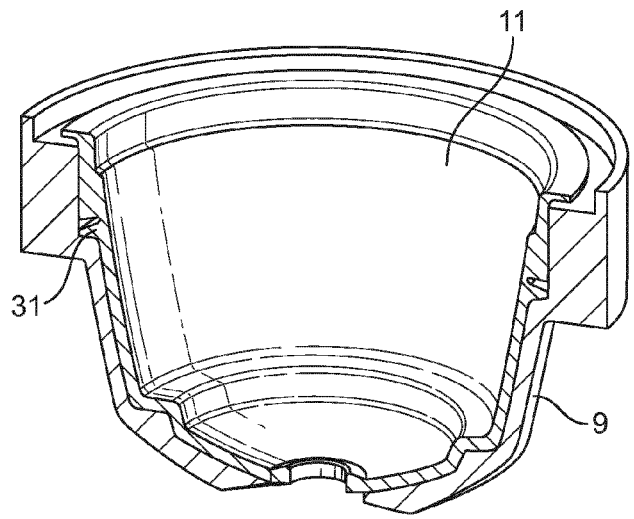

In a fifth embodiment illustrated in FIGS. 12A and 12B, the resilient deformable portion of the capsule 11 comprises a series of horizontal tongues 31 located substantially at mid-height of the capsule. These tongues 31 are made integrally with the rest of the capsule body, preferably by injection moulding. The number of horizontal tongues 31 can vary, but there are at least three, preferably at least four, more preferably at least ten of them, which are equally distributed around the capsule perimeter. They extend outside of the capsule body, outwardly, as shown in FIG. 12A.

When the capsule 11 is inserted functionally into the capsule holder 9, as illustrated in FIG. 12B, the capsule bottom part is not in contact with the capsule holder, due to the fact that the horizontal tongues 31 rest upon a middle-height edge 32 of the capsule holder. In this position, the whole capsule—except for the horizontal tongues 31—is lifted from, and not in contact with, the capsule holder as illustrated in FIG. 12B.

When the extraction head 5 of the machine is closed the needle plate 14 moves downwardly towards the capsule 31 and capsule holder 9. It contacts the upper edge 18 of the capsule and moves the whole capsule downwardly until the top edge 18 and needle plate contact the upper surface of the capsule holder, along the principle illustrated for instance in FIG. 2B. When the capsule is moved into the capsule holder by the pressure exerted by the needle plate, the tongues 31 are flexed upwardly. The elastic deformation of the tongues 31 generates a counterforce directed vertically and upwardly, towards the needle plate. Similarly to the preceding alternative embodiments of the invention described above, this counterforce can be measured by a pressure sensor which is in direct or indirect contact with the top edge 18 of the capsule.

So far, the invention was described such that the elastic deformation applied to the resilient deformable portion of the capsule is applied by the needle plate of the machine, during closing of the extraction head of the machine. However, it should be clear that this deformation can be applied in another way, whatever the type of resilient deformable portion of the capsule. For instance, the needle plate can be replaced by a pressure-measuring plate that is part of the capsules manufacturing lines in the factory. In that case, the elastic deformation counterforce generated by the resilient deformable portion of the capsule being deformed can be used for instance as a quality control tool, or a tracking tool for differentiating various types of capsules in the factory (each different type of capsule containing a different beverage preparation ingredient). In that case, each capsule is held in place on the manufacturing, filling and/or sealing line, as it is held in place by the capsule holder within a beverage preparation machine. Then a measuring plate moves from above the capsule, to press downwardly onto the top edge of the capsule, and elastically deform the resilient deformable portion of the capsule, as described above for each of the already described embodiments. The measuring plate comprises or is linked directly or indirectly, to a pressure force sensor. The measured force, which is an essential characteristic of each capsule, can be used to appropriately fill said capsule with a specific and predetermined type and/or quantity of beverage ingredient.

Figure 13A:
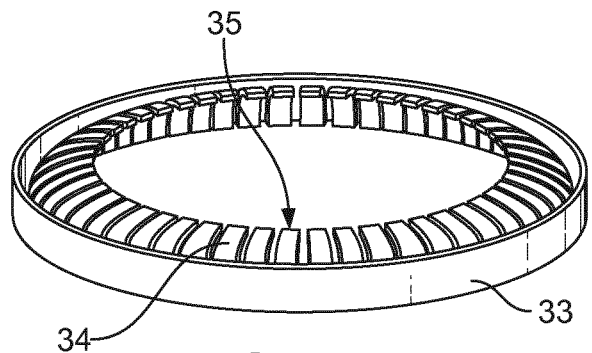
FIGS. 13A and 13B are schematic perspective views of an eleventh embodiment of a capsule according to the invention.
Figure 13B:
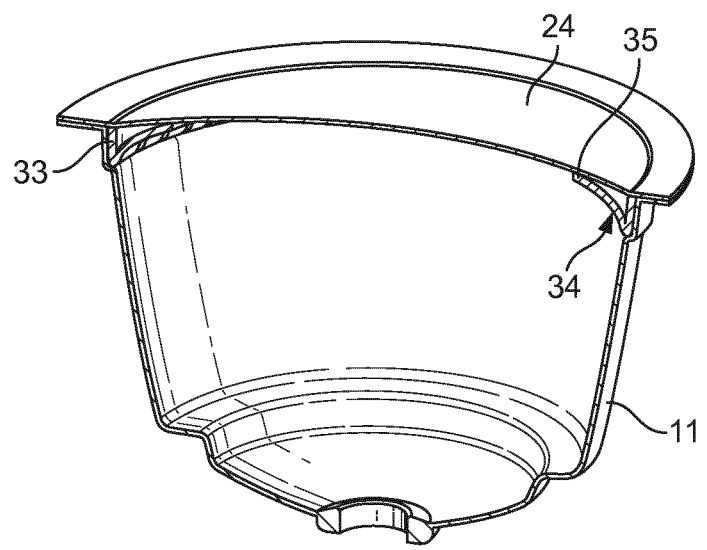

In a sixth embodiment illustrated in FIGS. 13A and 13B, the resilient deformable portion of the capsule is not manufactured integrally with the rest of the capsule body 12. Said resilient deformable portion comprises a ring 33 with a series of curved flexible arches 34 that extend inwardly and upwardly from the lowermost inner surface of the ring 33, towards the center of said ring, as shown in FIG. 13A. The tip 35 of each flexible arch 34 is positioned such that when the ring is assembled inside the capsule and the capsule is closed at its upper side with the top membrane 24, as shown in FIG. 13B, the tips 35 of the flexible arches 34 is in contact with, and lifts the top membrane 24.

When the capsule is inserted in the capsule holder and the extraction head is closed, the needle plate 14 comes in contact with, and presses onto the top membrane 24. As a result, the top membrane is flexed down together with the flexible arches 34 which are elastically deformed downwardly. The counterforce thus generated by the elastically deformed arches 34 can be sensed by a pressure sensor located for instance in the needle plate, or which is in direct or indirect contact with the latter, along the principle already described above. In that embodiment, the number, length, curvature, and cross-section, of the arches can be adapted to achieve suitable predetermined elastic deformation properties, in particular, a given and predetermined force constant "k". As explained above, the predetermined factor "k" is a function of a beverage preparation parameter or other data that is specific to the capsule and/or its contents.

Figure 14A:
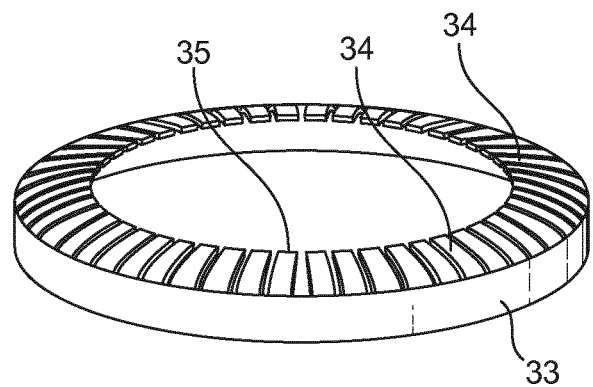
FIGS. 14A and 14B are schematic perspective views of a twelfth embodiment of a capsule according to the invention
Figure 14B:
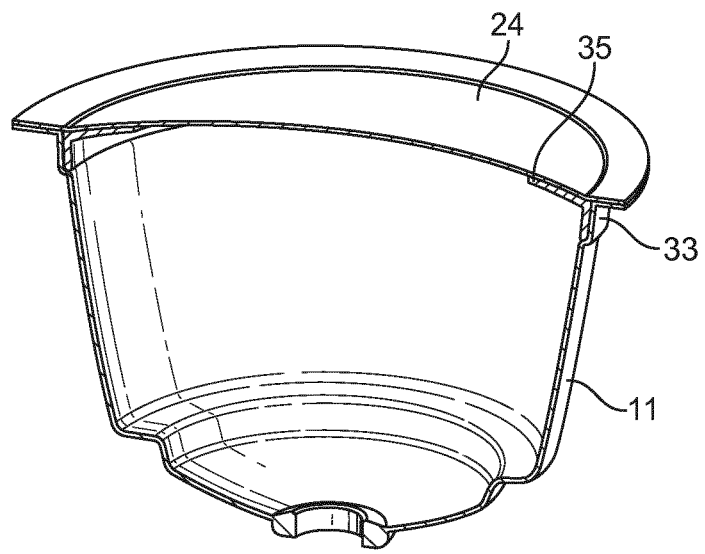

As an alternative to this embodiment of the invention, the arches 34 can extend from the uppermost inner surface of the ring 33, towards the center of said ring, as shown in FIG. 14A. The working principle remain identical to that described above with reference to FIGS. 13A and 13B. In that case also, the arches are in contact with the lower surface of the top membrane 24, and lift said top membrane in an upward convex position as illustrated in FIG. 14B.

Figure 15A:
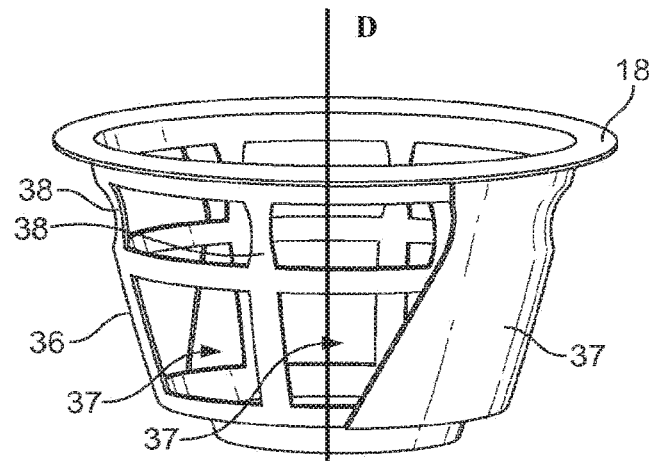
FIGS. 15A to 15C are schematic perspective views of thirteenth embodiment of a capsule as per the invention.
Figure 15B:
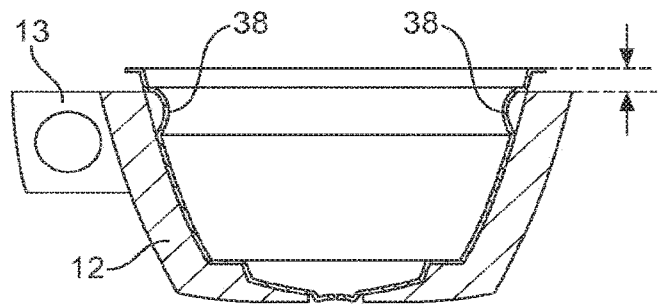
Figure 15C:
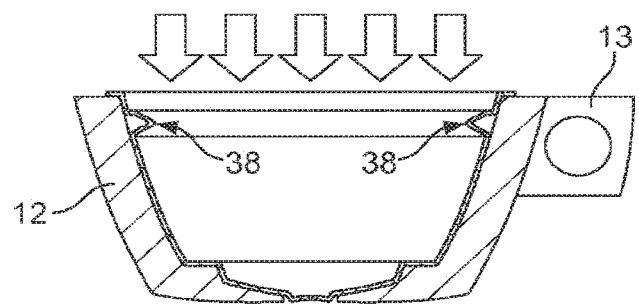

In a seventh and preferred embodiment of the invention illustrated in FIGS. 15A, 15B and 15C, the capsule body is made of a semi-rigid skeleton structure 36 (shown in FIG. 15A) which is covered by an oxygen barrier membrane 37.

The membrane 37 is for instance co-injection molded with the semi-rigid structure 36 by using an In-Mould Labeling (IML) process, as described for instance in Applicant's European patent application EP AN 11178061.

The semi-rigid skeleton structure 36 comprises at least one weakened zone that forms a bellows portion 38. For instance, the rest of the structure can be rigid, except this bellows portion 38 which is flexible. The flexibility of this portion 38 in the structure is achieved preferably by a smaller cross section compared to the rest of the structure. It can also be achieved (as an alternative or in addition to the smaller cross section) by a softer material which is co-injected with the rest of the structure 36.

In the embodiment shown in FIG. 15A, the bellows portion 38 is located at the top portion of the vertical area of the semi-rigid structure, such that the capsule can deform along a substantially vertical axis, i.e. when a vertical compression force is applied on said capsule.

When the capsule is placed in the capsule holder and the extraction head of the machine is open, as illustrated in FIG. 15B, the entire external surface of the capsule is in contact with the capsule holder, except for the top edge 18 of said capsule, which is lifted above the level of the upper surface of the capsule holder. In other words, the capsule height is greater than the capsule recess of the capsule holder. This height difference is indicated with arrows in the drawing.

When the extraction head of the machine is closed, the needle plate schematically illustrated with a series of arrows in FIG. 15C, presses onto the capsule, and compresses the latter so that it functionally fits into the volume defined between the capsule holder and said needle plate. The capsule flexes in the region of the flexible bellows portion 38 of its structure 36, as shown in FIG. 15C, until the top edge 18 of said capsule is pinched between the upper surface of the capsule holder and the lower surface of the needle plate. In that position, the capsule is functionally in place within the extraction head of the machine, the water injection needle (not shown in FIG. 15C) has pierced the top membrane of the capsule, and a brewing cycle can start in a leak-tight manner.

The counterforce generated within the bellows portion 38 can be measured by a sensor located in the needle plate, which senses the vertical force applied by the capsule onto said needle plate.

When the extraction head of the machine is opened again, the capsule flexes back into its original position shown in FIG. 15B.

Figure 16C:
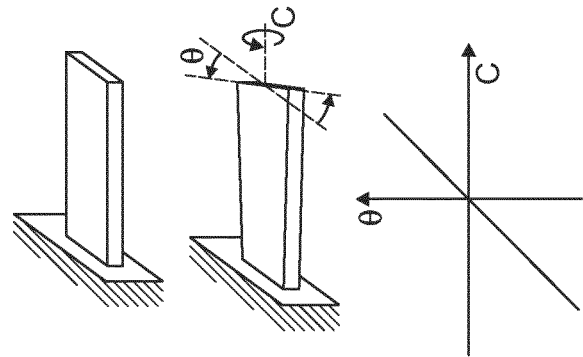
FIGS. 16A to 16C represent schematically and graphically the evolution of the elastic deformation of a solid resilient mechanical element as a function of the force applied to the same, respectively during: linear compression or stretching, bending, and torsion (i.e. twisting)
Figure 16B:
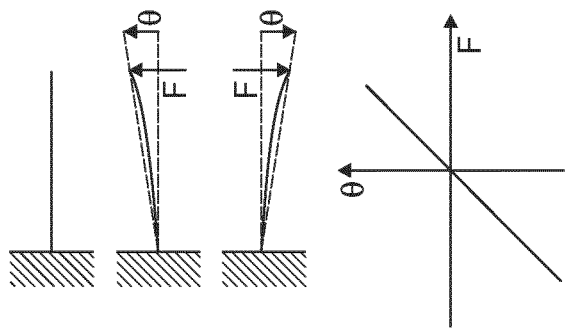
Figure 16A:
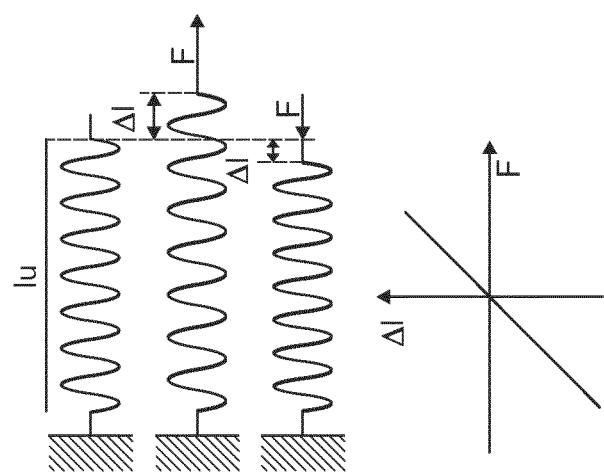

As a general principle underlying the invention, the deformation applied to the resilient deformable portion of the capsule follows a material behavior law, so that the force generated by the deformation of said deformable portion is a direct function of said deformation, whatever the type of deformation: compression (as in FIG. 16A), flexion (as in FIG. 16B) or torsion (as in FIG. 16C). In all types of deformation, the material behavior law states that the force with which the spring, or tongue or twisted portion, pushes back is a function to the distance from its equilibrium length, as follows:

$$F = f(x)$$

where

"x" is the displacement vector—the distance and direction the spring is deformed from its equilibrium length.

"f(x)" is the magnitude and direction of the restoring force the spring exerts.

In the case of a simple spring element, the elastic deformation force generated within the material is a direct, linear, function of the deformation amplitude ($F = k \cdot x$), and both are linked by a constant "k" which is known as the "spring constant" or "Young's modulus", which is an intrinsic characteristic of the material.

As explained above, the general principle of the present invention is that the factor "k" for each capsule is measured and interpreted by the beverage preparation machine as a beverage preparation parameter, or other data, and as a recognition data by the manufacturing line when the capsule is in the factory.

In the case of the present invention, it is assumed that the resilient deformable portion of the capsule is a complex spring element, which produces a force under deformation that is not necessarily linearly linked to the deformation amplitude.

Figure 17:
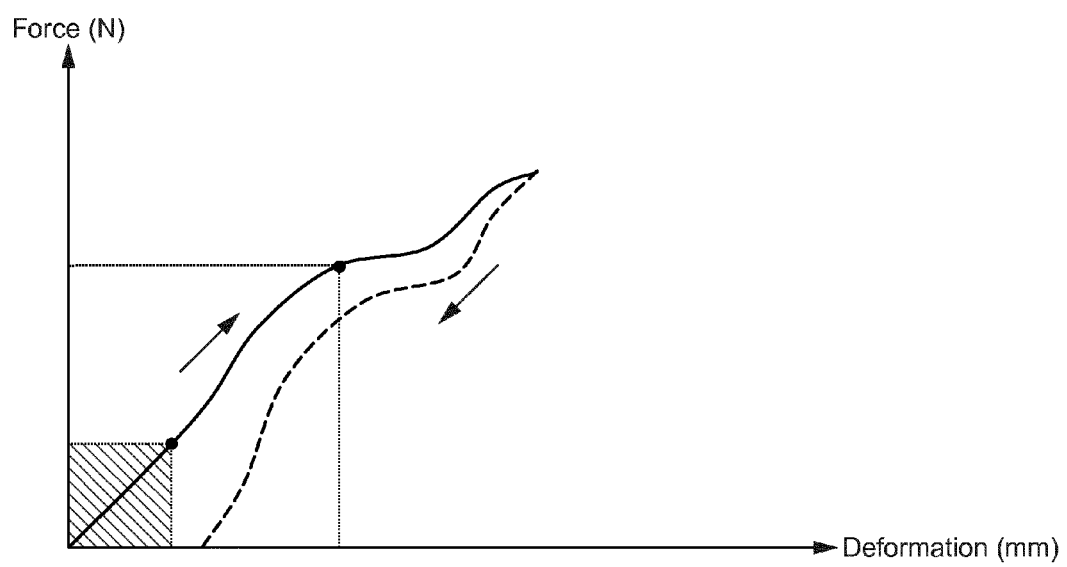
FIG. 17 represents schematically and graphically the evolution of the elastic and plastic deformation of a solid resilient mechanical element as a function of the force applied to the same (solid line), and its recovery when the force applied is released (dotted line).

In addition, the capsule according to the present invention is most preferably a non-reusable capsule. In that case, it is highly desirable to the consumer that the resilient deformable portion of the capsule be deformed not only along its elastic deformation amplitude, but beyond its elastic deformation limit, in its plastic deformation area. In other words, the capsule resilient deformable portion is preferably deformed so that it reaches its plastic deformation area, and the deformation applied will modify the intrinsic mechanical properties of the material. In such a case, when the machine's brewing head is opened after a food or beverage brewing cycle, the deformation energy contained in the resilient deformable portion of the capsule is released, so that said resilient portion moves back to a position close to its initial position. However, in such a case, due to the plastic modification of the material, and as illustrated in dotted curve line in FIG. 17, the deformability profile is different from the initial one (solid curve line in FIG. 17). In case the used capsule is inserted again within the machine, the machine will detect that the elastic deformability properties of the machine do not correspond to the deformation properties of a brand new capsule. In this case, the machine will stop and optionally send a warning signal to the user that s/he should replace the capsule with an unused one. The way the machine can detect the variation in the deformability curve, is for instance as illustrated in FIG. 17, by sensing and measuring the force generated within the resilient deformable portion of the capsule for a plurality of deformation amplitudes, for instance in two points as shown in FIG. 17: the first point is measured within the elastic deformation area of the material constitutive of the resilient deformable portion, then a second point is measured for a deformation which is greater and located within the plastic deformation area of the material constitutive of the resilient deformable portion of the capsule. As shown in FIG. 17, for a same elongation, the force generated within the material of the resilient deformable portion of the capsule, is different when the capsule is new/unused (plain curve), or when the capsule was already used or if it is damaged (dotted curve line).

Similarly, if a capsule is damaged during manufacturing in the factory, it can be detected and be removed from the manufacturing line.

In all of the embodiments described above, the resilient portion is deformable with an amplitude comprised between 0.1 mm and 20 mm, preferably comprised between 0.15 mm and 1.0 mm, more preferably comprised between 0.5 mm and 5 mm.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A food preparation system comprising:
an ingredient capsule; and
a food preparation machine adapted to cooperate functionally with the capsule, the food preparation machine comprising a cavity for receiving the capsule such that a food product is prepared in the capsule by injection of a fluid from the machine into the capsule, the cavity comprises a pressure sensitive portion adapted to cooperate with a capsule resilient deformable portion of the ingredient capsule to transmit operational data from the ingredient capsule to the machine, the data being a function of the elastic deformation properties of the capsule resilient deformable portion and comprises a setting value of a beverage preparation parameter selected from the group consisting of: water temperature, water pressure, volume of water to be pumped through the capsule, other machine operational data, and a combination thereof,
the capsule resilient deformable portion is configured to exert, upon deformation, a counterforce onto the food preparation machine, the pressure sensitive portion comprises a pressure sensor configured to measure the counterforce, the capsule resilient deformable portion having predetermined elastic deformation properties such that the counterforce corresponds to a predetermined value.

2. The food preparation system according to claim 1, wherein the pressure sensitive portion is linked to a control board of the machine, such that cooperation between the pressure sensitive portion and the capsule resilient deformable portion is able to trigger an operation within the machine when the capsule resilient deformable portion transmits a mechanical deformation to the pressure sensitive portion, the operation being recognition switching the machine to a status selected from the group consisting of on, off, and setting a food preparation parameter.

3. The food preparation system according to claim 1, wherein the pressure sensor is connected to an electrical switch.

4. The food preparation system according to claim 1, wherein the food product is a liquid or semi-liquid product prepared within the capsule by the food preparation machine injecting a fluid to be mixed with the encapsulated ingredient, at a pressure of between 0.5 and 30 bar.

5. The food preparation system according to claim 1, wherein the operational data that comprises the water temperature has a value ranging from about 12° C. to about 85° C.

* * * * *